(12) United States Patent
Rich

(10) Patent No.: US 8,869,028 B2
(45) Date of Patent: Oct. 21, 2014

(54) INTERFACE STRUCTURES AND ASSOCIATED METHOD FOR AUTOMATED MINING OF LEGACY SYSTEMS USING VISUAL CONFIGURATION TOOLS

(75) Inventor: David P. Rich, Brockport, NY (US)

(73) Assignee: Xerox Corporation, Norwalk, CT (US)

( * ) Notice: Subject to any disclaimer, the term of this patent is extended or adjusted under 35 U.S.C. 154(b) by 1003 days.

(21) Appl. No.: 12/467,320

(22) Filed: May 18, 2009

(65) Prior Publication Data

US 2010/0293506 A1 Nov. 18, 2010

(51) Int. Cl.
*G06F 3/00* (2006.01)
*G06Q 10/10* (2012.01)
*G06F 17/30* (2006.01)
*G06F 3/0481* (2013.01)
*G06F 9/44* (2006.01)

(52) U.S. Cl.
CPC .......... *G06F 17/30398* (2013.01); *G06Q 10/10* (2013.01); *G06F 9/4443* (2013.01); *G06F 3/0481* (2013.01); *G06F 17/30528* (2013.01)
USPC ............ 715/704; 715/762; 715/763; 707/762

(58) Field of Classification Search
CPC ......... G06F 8/38; G06F 9/541; G06F 9/3017; G06F 9/30174; G06F 17/30893; G06F 2212/1004
See application file for complete search history.

(56) References Cited

U.S. PATENT DOCUMENTS

| | | | | |
|---|---|---|---|---|
| 5,857,194 A * | 1/1999 | Kelliher et al. | ........................ | 1/1 |
| 5,912,669 A * | 6/1999 | Hsia | .............................. | 715/854 |
| 6,823,522 B1 * | 11/2004 | Lamb | ............................. | 719/316 |
| 6,836,780 B1 * | 12/2004 | Opitz et al. | ............................ | 1/1 |
| 7,343,310 B1 * | 3/2008 | Stender | ............................ | 705/4 |
| 7,647,370 B1 * | 1/2010 | Liu et al. | ........................ | 709/203 |
| 2002/0087356 A1 * | 7/2002 | Andros et al. | ..................... | 705/2 |
| 2003/0193521 A1 * | 10/2003 | Chen et al. | ..................... | 345/762 |
| 2004/0054812 A1 * | 3/2004 | Liang et al. | .................. | 709/250 |
| 2004/0133878 A1 * | 7/2004 | Cole et al. | ..................... | 717/115 |
| 2005/0028144 A1 * | 2/2005 | Bergman et al. | ............. | 717/128 |
| 2005/0257196 A1 * | 11/2005 | Hollander et al. | ............ | 717/115 |
| 2005/0278630 A1 * | 12/2005 | Bracey | .......................... | 715/704 |
| 2006/0155954 A1 * | 7/2006 | Haynes et al. | .................... | 712/1 |

(Continued)

OTHER PUBLICATIONS

"Reverse Engineering Legacy User Interfaces Using Interaction Traces," by El-Ramly, Mohammad. IN: Ph.D Thesis, University of Alberta (2003). Available at: http://www.cs.le.ac.uk/~mer14/El-RamlyCh1-3.ps Last visited: Sep. 19, 2011.*

(Continued)

*Primary Examiner* — Daniel Kinsaul
(74) *Attorney, Agent, or Firm* — Gibb & Riley, LLC

(57) ABSTRACT

Disclosed are embodiments of an interface structure and a method for automated data mining of a legacy system. A GUI is employed to navigate through the legacy system interface application and access a data field. Once the data field is displayed, the GUI can receive a tag from the user labeling the data field. Additionally, a screen tracing device can trace the sequence of events that ultimately results in the data field being displayed. The traced sequence and its corresponding tag are then stored in a data storage device. These processes can be repeated for multiple different data fields. Subsequently, a sequence applying device can retrieve one or more previously stored sequences in response to a request referencing the corresponding tag(s) and can apply the sequence(s) in order to access, for processing, data from the corresponding data field(s).

19 Claims, 6 Drawing Sheets

(56) References Cited

U.S. PATENT DOCUMENTS

| | | | |
|---|---|---|---|
| 2006/0184410 A1* | 8/2006 | Ramamurthy et al. | 705/8 |
| 2006/0184888 A1* | 8/2006 | Bala | 715/762 |
| 2007/0094372 A1* | 4/2007 | Hariharan et al. | 709/223 |
| 2007/0100994 A1* | 5/2007 | Armstrong et al. | 709/224 |
| 2007/0208767 A1* | 9/2007 | Cotichini | 707/101 |
| 2008/0022257 A1* | 1/2008 | Baartman et al. | 717/106 |
| 2008/0209348 A1 | 8/2008 | Grechanik et al. | |
| 2008/0209446 A1* | 8/2008 | Grechanik et al. | 719/320 |
| 2009/0037483 A1 | 2/2009 | Christensen | |
| 2009/0043789 A1* | 2/2009 | Gupta | 707/100 |
| 2009/0089368 A1* | 4/2009 | Fujiwara et al. | 709/203 |

OTHER PUBLICATIONS

"Creating Web Services from GUI-Based Applications," by Grechanik et al. IN: IEEE Int'l Conf. Service-Oriented Computing and Applications (2007). Available at: IEEE.*

* cited by examiner

INTERFACE STRUCTURES AND ASSOCIATED METHOD FOR AUTOMATED MINING OF LEGACY SYSTEMS USING VISUAL CONFIGURATION TOOLS

BACKGROUND AND SUMMARY

Embodiments herein generally relate to legacy systems and, more particularly, to an interface structure and method for automated data mining of legacy systems using visual configuration tools.

The term "legacy system", as used herein, generally refers to an existing interactive computer system that is deployed in an organization and that is based on an outdated technology. Legacy systems can include a variety of different types of business, production and/or operational systems, which store a significant amount of historical and transactional data. For example, legacy systems can include personnel management systems, file management systems, production planning systems, inventory systems, order tracking systems, etc. Unfortunately, since the technology employed by such legacy systems are outdated, the legacy interface applications that must be used to retrieve stored data are often relatively difficult to interact with and time-consuming as compared to modern interface applications. Additionally, many legacy systems were originally designed to be proprietary (i.e., under the sole control and use of the organization employing it) and closed (i.e., unable to communicate with external systems for data exchange). Thus, they do not provide a means by which stored data could be processed, either manually or through automation, to feed external data warehouses. While many organizations are redesigning or replacing their legacy systems, doing so is not always feasible given the costs involved.

In view of the foregoing disclosed herein are embodiments of a generic interface structure and an associated method for automated data mining of legacy systems using visual configuration tools. In these embodiments, a user employs a graphical user interface (GUI) to navigate through a legacy system interface application in order to access a data field containing data stored by the legacy system. Once a screen with the particular data field is displayed, the GUI receives, from the user, a tag labeling the data field. Additionally, as the user navigates through the interface application, a screen tracing device traces the sequence of events that ultimately results in the data field being displayed. The traced sequence and its corresponding tag are then stored in a data storage device. These processes can be repeated for multiple different data fields accessible through the legacy system interface application. Subsequently, a sequence applying device retrieves one or more particular sequences from the data storage device in response to a request referencing the corresponding tag(s) and automatically applies the particular sequence(s) in order to access, for processing, corresponding data field(s).

More particularly, disclosed are embodiments of a generic interface structure through which automated data mining of any legacy system can be achieved. This interface structure can comprise a GUI, a sequence tracing device, a data storage device, and a sequence applying device.

The (GUI) can be operatively connected to a legacy system and, particularly, to the interface application of the legacy system. The GUI can receive inputs from a user in order to access a data field through the interface application of the legacy system. As the inputs are being received, the GUI can display screens generated by the interface application, based on the inputs, until a screen containing the data field is displayed. Then, when the screen with the data field is displayed, the GUI can receive, from the user, a tag labeling the data field. The sequence tracing device can be operatively connected to the GUI and can, as the inputs are being received by the GUI, automatically trace the sequence of events ultimately resulting in the display of the screen with the data field. Such events can include any actions (e.g., filling in form fields, activating screen terminators, etc.) required for screen-to-screen navigation through the interface application in order to pull-up the screen with the data field. The data storage device can be operatively connected to the sequence tracing device and can store the traced sequence with the corresponding tag. Storage can be in, for example, an Extensible Markup Language (XML) file, a database table or other suitable storage media format.

Using the components described above, sequence-tag records can be acquired and stored for multiple data fields that are accessible through the legacy system interface application. That is, the GUI can separately receive different sets of inputs from a user to access different data fields. As each set of inputs is received, the GUI can display screens, generated by the interface application based on the set of inputs, until a screen containing a particular one of the data fields is displayed. Then, when the screen with the particular data field is displayed, the GUI can receive, from the user, a tag labeling that particular data field. With each set of inputs, the sequence tracing device can automatically trace the sequence of events resulting in display of the screen with the particular data field and the data storage device can store the sequence with its corresponding tag. Thus, the data storage device can be used to store sequence-tag records for any number of defined data fields.

The sequence applying device can be operatively connected to the data storage device and to the GUI. The sequence applying device can automatically access the data storage device to retrieve any given sequence in response to a request referencing a corresponding tag for that sequence and further can automatically apply the given sequence to the legacy system interface application in order to access the particular data field with which the tag is associated. During application of the sequence, the sequence applying device can initiate any of the actions noted in the sequence as being required for screen-to-screen navigation through the interface application in order to pull-up the screen containing the particular data field. Rather than displaying each screen in this navigation process, the sequence applying device can cause the GUI to simply display a list identifying all of the screens in the sequence. Additionally, as mentioned above, the sequence actions can include activating screen terminators and filling in form fields. Thus, the sequence applying device can automatically initiate defined screen terminators without user input and can also automatically cause the GUI to prompt the user to input any information required to fill in form fields in the sequence.

Once data is acquired through application of a given sequence by the sequence applying device, the data can be processed manually or automatically. For example, the embodiments can further comprise a data processor operatively connected to the sequence applying device. This data processor can automatically process data contained in a data field following application of the sequence by the sequence applying device. Such processing can include, but is not limited to, reformatting the data so that it can be fed into and stored by a data warehouse (i.e., a relational database).

Also disclosed herein are embodiments of an associated computer-implemented method of interfacing with a legacy system. In the method embodiments, a GUI can receive inputs from a user in order to access a data field through an interface application of a legacy system. As the inputs are received, screens generated by the interface application in response to the inputs can be displayed by the GUI until such a screen containing the data field is displayed. When the screen with the data field is displayed, the GUI can receive, from the user, a tag labeling the data field. Additionally, as the screens are being displayed by the GUI, the sequence of events ultimately resulting in the display of the screen with the data field can automatically be traced by a sequence tracing device. Such events can include any actions (e.g., filling in form fields, activating screen terminators, etc.) required for screen-to-screen navigation through the interface application in order to pull-up the screen with the data field. Then, the sequence and its corresponding tag can be stored in a data storage device. Storage can be in, for example, an Extensible Markup Language (XML) file, a database table or other suitable storage media format.

The processes described above can be repeated so that sequence-tag records can be acquired and stored for multiple different data fields that are accessible through the legacy system interface application. That is, the GUI can separately receive different sets of inputs from a user in order to access different data fields. As each set of inputs is received, screens that are generated by the interface application based on the set of inputs can be displayed by the GUI until a screen containing a particular one of the data fields is displayed. Then, when the screen with the particular data field is displayed, the GUI can receive, from the user, a tag labeling that particular data field. With each set of inputs, the sequence tracing device can automatically trace the sequence of events resulting in display of the screen with the particular data field and the data storage device can store the sequence with its corresponding tag. Thus, the data storage device can be used to store sequence-tag records for multiple different data fields.

Subsequently, this data storage device can be automatically accessed by a sequence applying device in order to retrieve any given sequence in response to a request referencing a corresponding tag for that sequence. Furthermore, once retrieved, a sequence can be automatically applied to the legacy system interface application by the sequence applying device in order to access the particular data field with which the sequence's corresponding tag is associated. During application of the sequence, any of the actions noted in the sequence as being required for screen-to-screen navigation through the interface application can be initiated by the sequence applying device in order to pull-up the screen containing the particular data field. However, at this point rather than displaying each screen in the navigation process, a list simply identifying all of the screens in the sequence can be displayed by the GUI. Additionally, as mentioned above, sequence actions can include activating screen terminators and filling in form fields. Thus, defined screen terminators can be automatically initiated by the sequence applying device without user input and a user can be automatically prompted, by the GUI, to input any information required to fill in form fields in the sequence.

Once data is acquired through application of a given sequence, the data can be processed manually or automatically, by a data processor. Such processing can include, but is not limited, reformatting the data so that it can be fed into and stored by a data warehouse (i.e., a relational database).

Also disclosed herein are embodiments of a computer program product. This computer program product can comprise a computer usable medium. The computer useable medium can have computer useable program code embodied therewith, which can be configured to perform the above-described method embodiments.

BRIEF DESCRIPTION OF THE DRAWINGS

Various exemplary embodiments of the systems and methods are described in detail below, with reference to the attached drawing figures, in which.

DETAILED DESCRIPTION

As mentioned above, since architecture employed by legacy systems are outdated, the legacy interface applications that must be used to retrieve stored data are often relatively difficult to interact with and time-consuming as compared to modern interface applications. Additionally, many legacy systems were originally designed to be proprietary (i.e., under the sole control and use of the organization employing it) and closed (i.e., unable to communicate with external systems for data exchange). Thus, they do not provide a means by which stored data could be processed, either manually or through automation, to feed external data warehouses. While many organizations are redesigning or replacing their legacy systems, doing so is not always feasible given the costs involved.

Manual uploading of data from a legacy system into another more modern system can be very slow and expensive. Current techniques for automated uploading of data from a legacy system involve writing a unique application for the particular legacy system. To write such a unique application a "screen-scraping" process is performed, which requires accessing each screen of the legacy system interface application and specifying for each screen the row and column of each data field on the screen (i.e., counting character offsets and field widths for each data field). This information is then hard coded or put into data tables for the application. Changes in the screens due to business process changes can necessitate re-engineering of these applications. Therefore, applications, which allow for automated uploading of legacy data and which are generated using screen scraping processes, can be expensive to develop and maintain.

In view of the foregoing disclosed herein are embodiments of a generic interface structure and an associated method for automated data mining of legacy systems using visual configuration tools. In these embodiments, a user employs a graphical user interface (GUI) to navigate through a legacy system interface application in order to access data field(s) containing data stored by the legacy system. Once a screen with the particular data field is displayed, the GUI receives, from the user, a tag labeling the data field. Additionally, as the user navigates through the interface application, a screen tracing device traces the sequence of events that ultimately results in the data field being displayed. The traced sequence and its corresponding tag are then stored in a data storage device. These processes can be repeated for multiple data fields accessible through the legacy system interface application. Subsequently, a sequence applying device retrieves one or more particular sequences from the data storage device in response to a request referencing the corresponding tag(s) and automatically applies the particular sequence(s) in order to access, for processing, corresponding data field(s).

Figure 1:
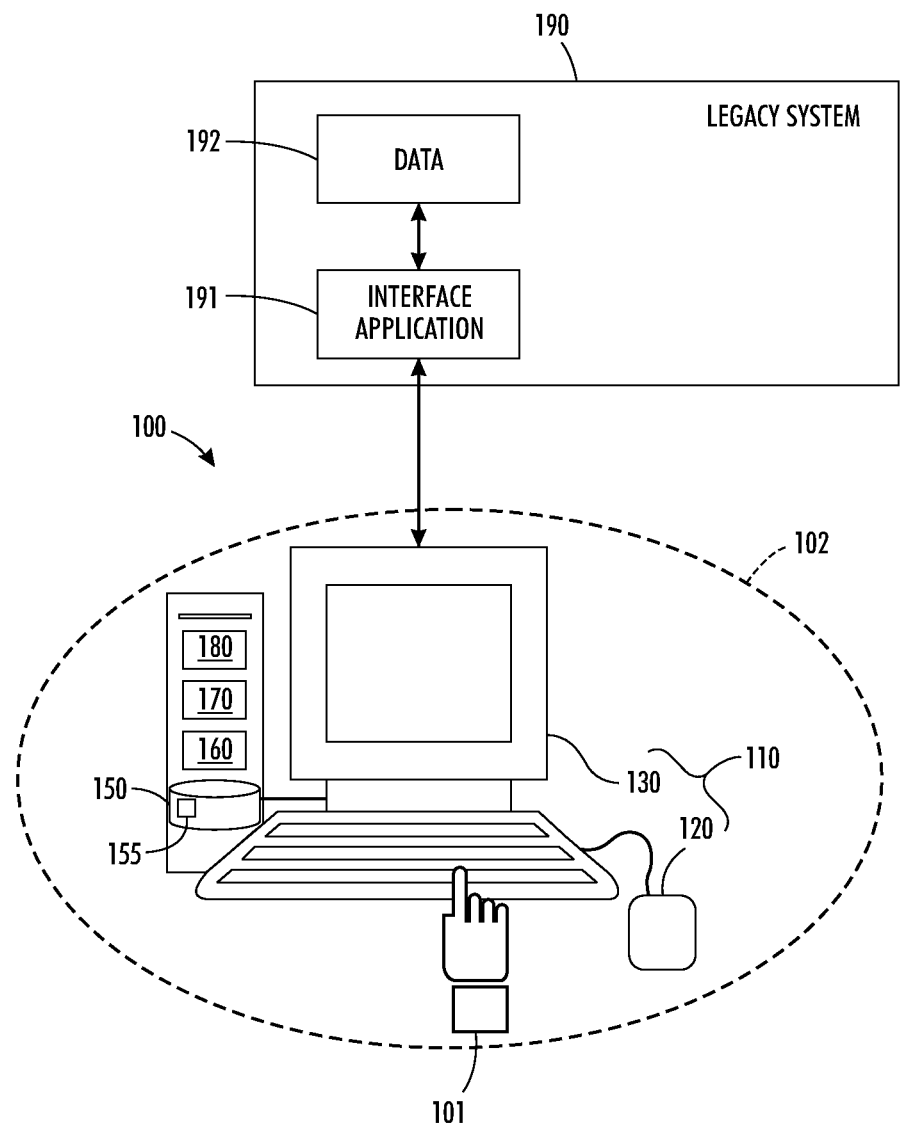
FIG. 1 is a schematic diagram illustrating an embodiment of a generic interface structure for automated data mining of legacy systems.

More particularly, referring to FIG. 1, disclosed herein are embodiments of a generic interface structure 100 through which automated data mining of any legacy system 190 can be achieved. This interface structure 100 can be implemented on any one or more computer devices 102 (e.g., a desktop computer (as illustrated), laptop computer, a dedicated server, etc.) and can particularly comprise a GUI 110, a sequence tracing device 160, a data storage device 150, and a sequence applying device 170.

The GUI 110 can comprise a conventional GUI having a plurality of components allowing for interactions with a user 101, including but not limited to, input devices 120 (e.g., a keyboard, mouse, or any other suitable input device) and a visual display unit 130 (i.e., a monitor or screen). The computer device 150 and, particularly, the GUI 110 can be operatively connected to a legacy system 190 to allow interaction between the user 101 and the interface application 191 of the legacy system 190. The legacy system interface application 191 operates as "data source layer" for the interface structure 100 (i.e., a wrapper around the communication protocol which provides access to data in the legacy system and it enables the use of third party software to provide the lowest level of communications). It can further operate as a "screen navigation layer" for the interface structure 100 (i.e., it can manage the flow of data 191 coming from the legacy system 190 and can provide the mechanism for traversing from screen to screen, based on internal parameter data). Thus, the GUI 110 in conjunction with the legacy system interface application 191 allow for data mining by screen-to-screen navigation and access to on-screen data fields.

Figure 2:
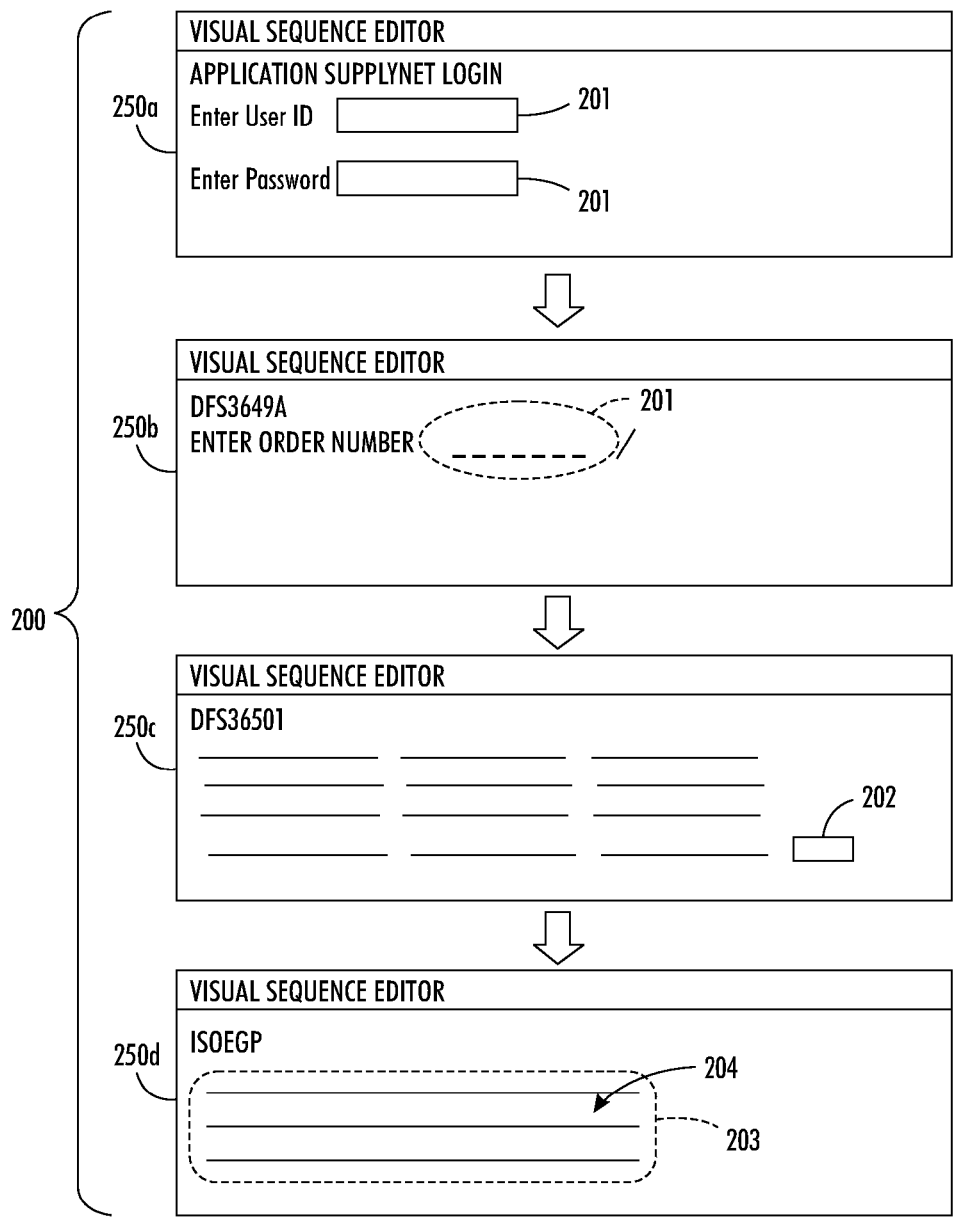
FIG. 2 is a schematic diagram illustrating exemplary graphical user interface (GUI) screen shots displayed during screen-to-screen navigation sequence tracing.

Specifically, referring to FIG. 2 in combination with FIG. 1, the GUI 110 can receive inputs 201, 202 from a user 101 through one or more input devices 120 in order to access a particular data field 203 and acquire data 204. As the inputs 201, 202 are being received, the GUI 100 can display (i.e., can be adapted to display, configured to display), on display 130, screens 250a-d that are generated by the interface application 192 based on the user's inputs 201-202, until a screen 250d containing the particular data field 203 with data 204 is displayed and the navigation sequence 200 is complete.

The sequence tracing device 160 can be operatively connected to the GUI 110. This sequence tracing device 160 can operate as a "sequencer layer" for the interface structure 100. That is, as the inputs 201, 202 are being received by the GUI 110, the sequence tracing device 160 can automatically trace (i.e., can be adapted to automatically trace, can be configured to automatically trace) the sequence 200 of events ultimately resulting in the display of the screen 250d with the data field 203. Such events can include any actions required for screen-to-screen navigation through the interface application 191 in order to pull-up the screen 250d with the data field 203. These sequence actions can include user inputs 201 filling in form fields (e.g., a password, user id, a specific date or date range, a specific order number, a specific tracking number, a specific address, a specific company name, etc.) and user inputs 202 activating screen terminators (e.g., enter key strikes on the keyboard 120, link or button activations on a displayed screen, such as screen 250c, etc.). Thus, the traced navigation sequence 200 comprises a set of sequence configuration data associated with accessing the particular data field 203. This set identifies screen navigation parameters (i.e., identifies each screen 250a-d in a sequence in order) and further defines, for each screen 250a-d in the sequence 200, all inputs 201 (i.e., any form field information that must be input by a user, also referred to herein as runtime parameter values) and 202 (i.e., any screen terminator that must be activated).

Figure 3:
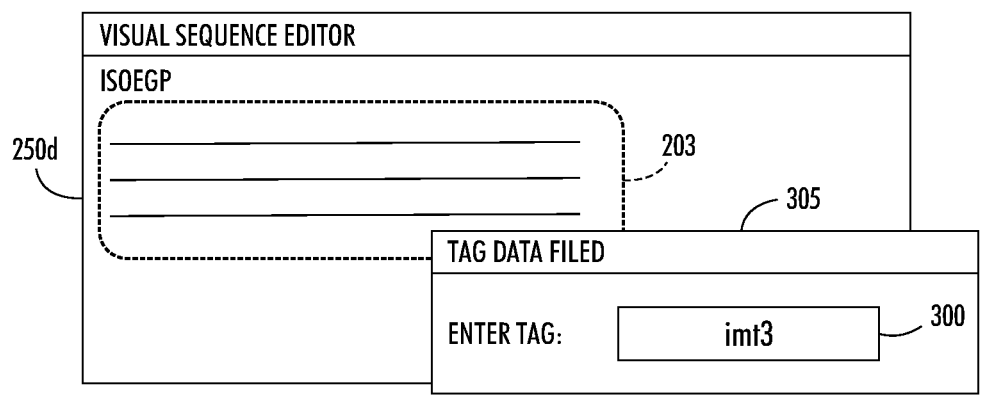
FIG. 3 is a schematic diagram illustrating an exemplary window prompting input of a data field tag following screen-to-screen navigation and tracing.

Additionally, when the screen 250d with the particular data field 203 containing data 204 is displayed, the GUI 110 can receive, from the user 101, a tag 300 labeling the particular data field 203 (see FIG. 3 in combination with FIGS. 1-2). For example, the interface structure 100 can be configured to allow the user 101 to select a particular data field 203 appearing on a particular screen 250d (e.g., by right clicking on the data field 203) in order to pull up a window 305 that will allow the user 101 to enter a tag 300 (i.e., a name) and, thereby label the particular data field 203. Thus, the sequence 200 of FIG. 2, as traced by the sequence tracing device 160, and the tag 300 of FIG. 3, as defined by the user 101, can be combined to create a sequence-tag record in the form of a key/value pair. In this manner, the GUI 110 operates as a "visual sequence editor" that enables a screen-to-screen navigation sequence 200 associated with a particular data field 203 (i.e., the set of sequence configuration data associated with a particular data field) to be defined as a key/value pair.

The data storage device 150 can be operatively connected to the sequence tracing device 160 and can store (i.e., can be adapted to store, can be configured to store) the sequence-tag record 155 (i.e., the traced sequence 200 with the corresponding tag 300 in the form of a key/value pair). Storage can be in, for example, an Extensible Markup Language (XML) file, a database table or other suitable storage media format. This data storage device 150 operates as a "sequence provider layer" in that it stores the sequence (i.e., the set of sequence configuration data associated with accessing the particular data field) for subsequent application upon request.

Using the components described above, sequence-tag records 155 can be acquired and stored in the data storage device 150 for multiple different data fields that are accessible through the legacy system interface application 191. That is, the GUI 110 can separately receive, through input devices 120, different sets of inputs from a user 101 to access different data fields. As each set of inputs is received, the GUI 110 can display, on display 130, screens, generated by the interface application 191 based on the set of inputs, until a screen containing a particular one of the data fields is displayed. Then, when the screen with the particular data field is displayed, the GUI 110 can receive, from the user 101, a tag labeling that particular data field. With each set of inputs, the sequence tracing device 160 can automatically trace the sequence of events resulting in display of the screen with the particular data field and the data storage device 150 can store the sequence with its corresponding tag. Thus, the data storage device 150 can be used to store sequence-tag records 155 for multiple different data fields.

It should be noted that the tag 300 (as shown in FIG. 3) can be assigned by the user 101 so as to designate how the sequence associated with the particular data field should be stored. For example, assuming that a database is used to store sequence-tag records 155 in the data storage device 150 of FIG. 1, the tag of Order.Status could specify that the record be placed in a database table called Order, using a field name Status. The table could then be made up of all fields defined with the table name of Order. Multiple occurrences of the same name could result in multiple records.

The sequence applying device 170 (i.e., sequencer, sequence engine) can be operatively connected to the data storage device 150 and to a GUI 110. The sequence applying device 170 can automatically access (i.e., can be adapted to automatically access, can be configured to automatically access) the data storage device 150 to retrieve any given sequence in response to a request referencing a corresponding tag for that sequence and further can automatically apply (i.e., can be adapted to automatically apply, can be configured to automatically apply) the given sequence in conjunction with the interface application 191 in order to access the particular data field with which the tag is associated. For example, if a query referencing the particular tag "imt3" (see item 300 of FIG. 3) is received by the GUI 110, the sequence 200 (i.e., the set of sequence configuration data), which was associated with that tag 300 and stored in the database 150, is loaded into the sequence applying device 170 and applied to the interface application 191 of the legacy system 190. During application of the sequence 200, the sequence applying device 170 can communicate with the legacy system interface application 191 and can initiate any of the actions noted in the sequence 200 as being required for screen-to-screen navigation through the interface application 191 in order to access the screen 250d containing the particular data field 203 and acquire data 204.

Figure 4:
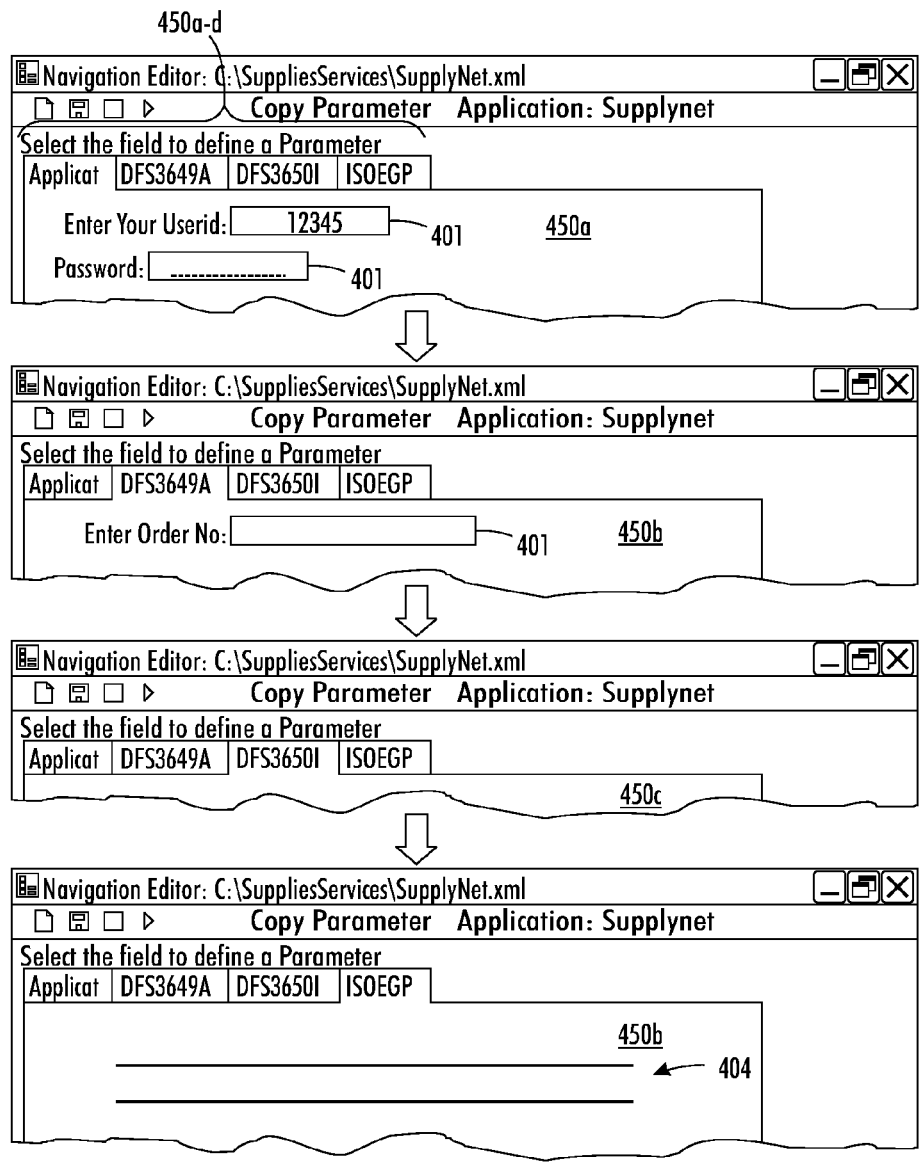
FIG. 4 is a schematic diagram illustrating exemplary GUI screen shots during application of a previously traced and stored sequence.

Automatic sequence application can be accomplished almost completely internally by the sequence applying device 170. That is, it can be accomplished without displaying the screens 250a-d of FIG. 2 generated by the interface application 191, as was required during sequence tracing. Rather, the sequence applying device 170 can simply cause the GUI 110 to display a list identifying all of the screens in the sequence 200 and may indicate, for example, which screen in the interface application is currently open. For example, as illustrated in FIG. 4, in response to a request referencing the tag "imt3" in the application "Supplynet", tabs 450a-d corresponding to and identifying the screen names for each of the screens 250a-d in the sequence 200 can be displayed.

Furthermore, as mentioned above and discussed with regard to FIG. 2, the sequence 200 (i.e., the set of sequence configuration data) not only identifies screen navigation parameters (i.e., identifies each screen in a sequence in order), but also defines, for each screen 250a-d in the sequence 200, any runtime parameter values 201 and any screen terminators 202 required in order to enable the sequence 200 to access the particular data field 203 and acquire particular information of interest 204. Thus, during application of a particular sequence 200, the sequence applying device 170 will automatically apply any defined screen terminators. However, in order to receive the necessary runtime parameter values 201, the sequence applying device 170 can cause the GUI 110 to prompt the user 101 to input any required information for filling in form fields. Thus, as shown in FIG. 4, tabs 450a-b can contain input prompts 401 which correspond to the required form field inputs 201 of screens 250a-250b in the sequence 200, respectively. It should be understood that because a user can change the inputs 401 over what was originally input into fields 201 during screen-to-screen navigation and tracing, the information 404 pulled-up by the sequence applying device 170 and shown in tab 450d of FIG. 4 may be different than the information 204 shown in screen 250d of FIG. 2. For example, if the data field provides order tracking information and a form field in the sequence requires an order number, then different order numbers will pull-up different tracking information when the same sequence is applied. Similarly, if the data field provides test results and form fields in the sequence require a test number and/or a test date, then different test numbers and/or dates will pull-up different results when the same sequence is applied. In this manner, the GUI 110 operates as a "navigation editor" that uses a previously defined key/value pair (i.e., a previously defined sequence-tag record) to implement a screen navigation sequence that will enable data to be programmatically acquired from a legacy system.

Once data 404 is acquired through application of a given sequence by the sequence applying device 170, the data 404 can be processed manually or automatically. For example, the embodiments can further comprise a data processor 180 operatively connected to the sequence applying device 170. This data processor 180 can automatically process data 404 acquired during application of the sequence by the sequence applying device 170. Such processing can include, but is not limited, reformatting the data 404 (e.g., into dataset(s), spread sheet(s), objects with named parameters or any other construct as developed). Once reformatted, the data 404 can, for example, be fed into and stored by a data warehouse. Thus, the data processor 180 operates as a "screen data processing layer" configurable on an application basis to interpret and further process the data (i.e., information of interest) acquired when a particular data field is access by the sequence applying device.

As mentioned above and illustrated in FIG. 1, the various components (e.g., the GUI 110, a sequence tracing device 160, a data storage device 150, a sequence applying device 170 and data processing device 180) of the interface structure 100 can be implemented using any one or more computer devices 102 (e.g., a desktop computer (as illustrated), laptop computer, a dedicated server, etc.). Computer devices 102 commonly include chip-based central processing units (CPU's), input/output devices (including graphic user interfaces (GUI)), memories, power supplies, comparators, processors, etc. and are well-known and readily available through a variety of different manufacturers (e.g., Dell Computers, Round Rock Tex., USA and Apple Computer Co., Cupertino Calif., USA). The details of computer devices 102 are omitted to allow the reader to focus on the salient aspects of the embodiments described herein. Additionally, any of the various components of the interface structure 100 may be in the form of software and/or hardware. Furthermore, while the interface structure 100 is shown in FIG. 1 as having a number of discrete processing components (e.g., sequence tracing device 160, sequence applying device 170 and data processor 180), any two or more of these components may be combined into a single processing component and any one of these components may be divided into two or more components.

Figure 5:
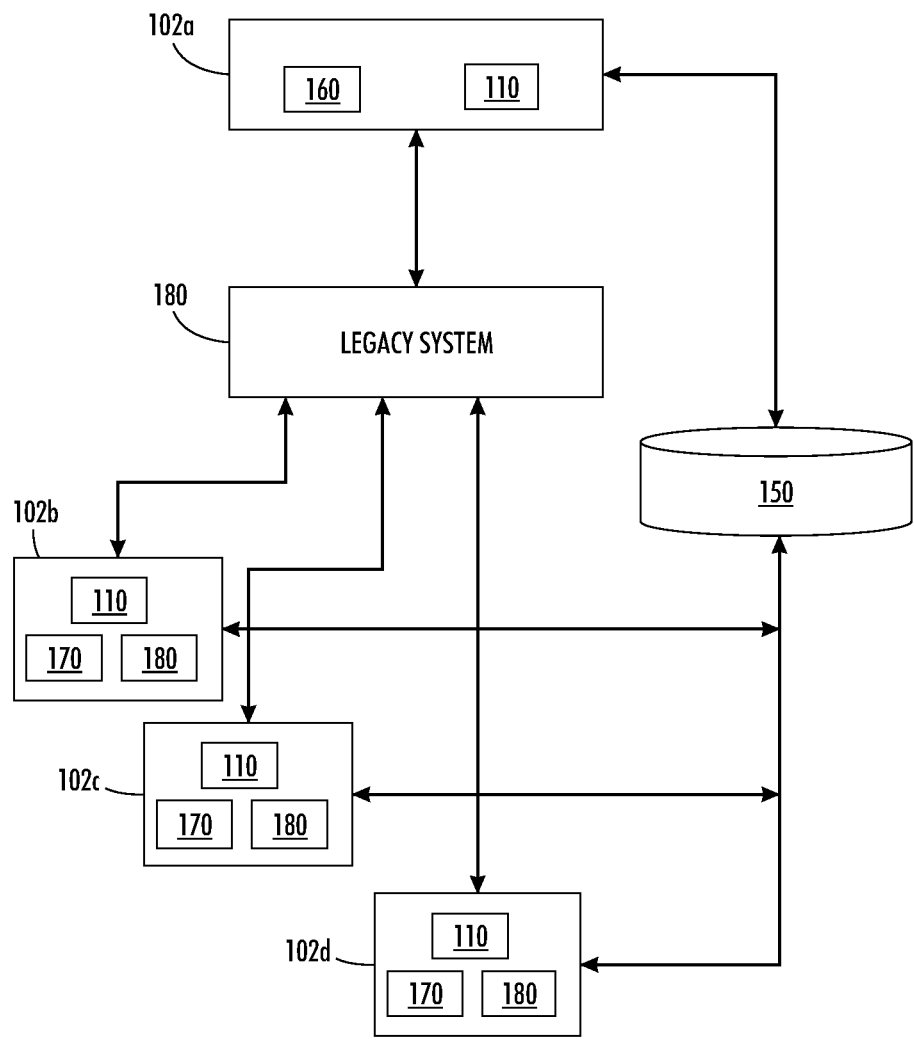
FIG. 5 is a schematic diagram illustrating another embodiment of a generic interface structure for automated data mining of legacy systems.

Finally, while the interface structure 100 is shown in FIG. 1 as being implemented on a single computer device 102, the various components may alternatively be maintained on more than one computer device. For example, as illustrated in FIG. 5, one computer device 102a may be configured with a GUI 110 and sequence tracing device 160 and employed by a user familiar with the legacy system 190 and, more particularly, familiar with the legacy system interface application 191 in order to acquire sequence configuration data. The sequence configuration data may then be stored in a centralized database 150. The sequence configuration data stored in the centralized database 150 may in turn be accessible by one or more different computer devices 102b-d, each configured with a GUI 110, sequence applying device 170 and data processing device 180. Thus, the computer devices 102b-d can be employed by users that are not necessarily familiar with the legacy system interface application 191 to access and process the legacy data programmatically.

Figure 6:
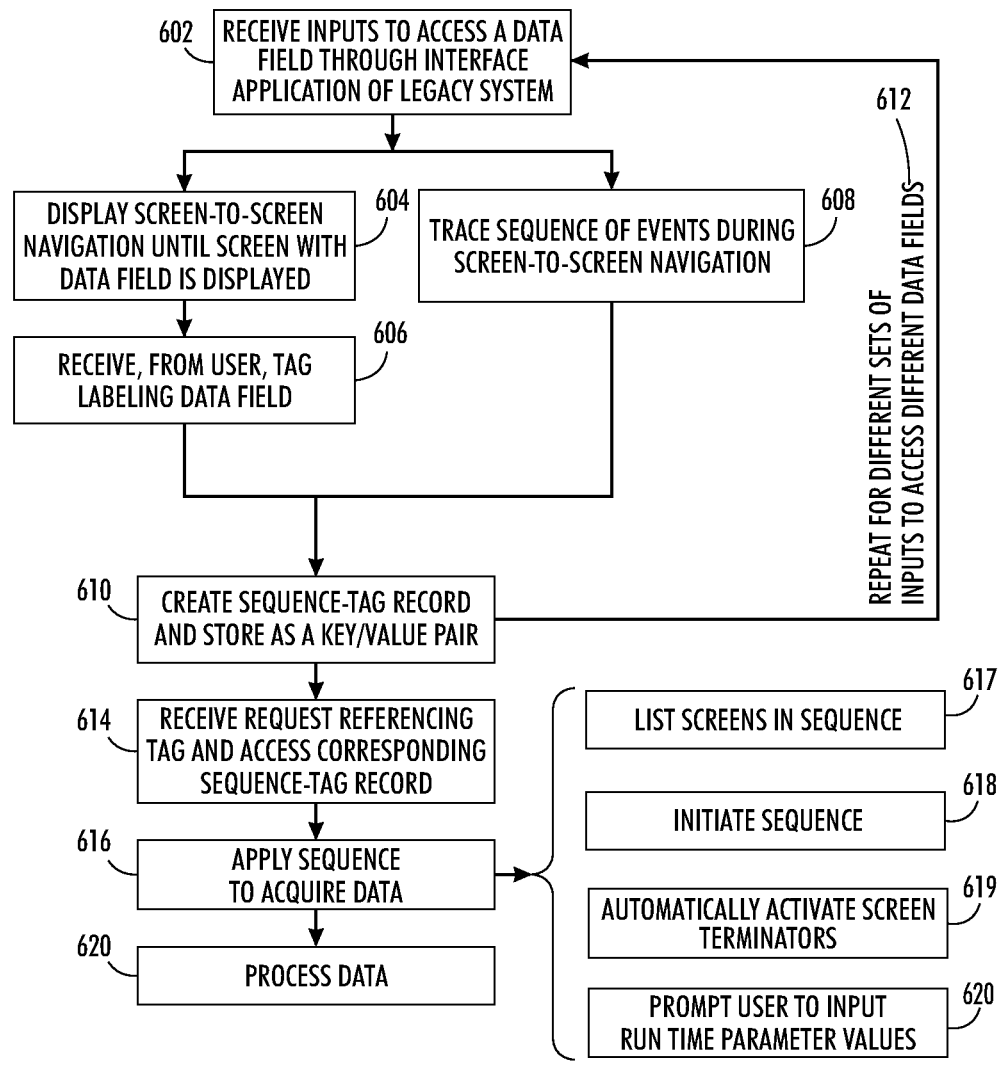
FIG. 6 is a flow diagram illustrating an embodiment of a method of interfacing with a legacy system.

Referring to FIG. 6, also disclosed herein are embodiments of an associated computer-implemented method of interfacing with a legacy system. In the method embodiments, a GUI 110 can receive inputs 201, 202 from a user 101 in order to access a data field 203 through an interface application 191 of a legacy system 190 (602, see FIGS. 1-2). As the inputs are received, screens 250a-d generated by the interface application 191 in response to the inputs 201, 202 can be displayed by the GUI 110 until such time as a screen 250d containing the data field 203 with data 204 is displayed (604, see FIGS. 1-2). When the screen 250d with the data field 203 is displayed, the GUI 110 can receive, from the user 101, a tag 300 labeling the data field 200 (606, see FIGS. 1 and 3). Additionally, as the screens 250a-d are being displayed by the GUI 110, the sequence 200 of events ultimately resulting in the display of the screen 250d with the data field 203 can automatically be traced by a sequence tracing device 160 (608, see FIGS. 1-2). Such events can include any actions (e.g., filling in form fields 201, activating screen terminators 202, etc.) required for screen-to-screen navigation through the interface application 191 in order to pull-up the screen 250d with the data field 203. Then, the screen navigation sequence 200 and its corresponding tag 300 can combined to create a sequence-tag record 155 and the sequence-tag record 155 can be stored as a key/value pair in a data storage device 150 (610, see FIGS. 1-3). Storage can be in, for example, an Extensible Markup Language (XML) file, a database table or other suitable storage media format.

The processes 602-610 described above can be repeated so that sequence-tag records 155 can be acquired and stored for multiple different data fields that are accessible through the legacy system interface application 191 (612). That is, the GUI can separately receive different sets of inputs from a user in order to access different data fields. As each set of inputs is received, screens that are generated by the interface application based on the set of inputs, can be displayed by the GUI until a screen containing a particular one of the data fields is displayed. Then, when the screen with the particular data field is displayed, the GUI can receive, from the user, a tag labeling that particular data field. With each set of inputs, the sequence tracing device can automatically trace the sequence of events resulting in display of the screen with the particular data field and the data storage device can store the sequence with its corresponding tag. Thus, the data storage device can be used to store sequence-tag records for multiple different data fields.

Subsequently, this data storage device 150 can be automatically accessed by a sequence applying device 170 in order to retrieve any given screen navigation sequence (e.g., sequence 200 of FIG. 2) in response to a request referencing a corresponding tag (e.g., tag "imt3" 300 of FIG. 3) for that sequence (614). Furthermore, once retrieved, the screen navigation sequence 200 can be automatically applied by the sequence applying device 170 to the interface application 191 of legacy system 190 in order to access the particular data field 203 with which the sequence's corresponding tag 300 is associated and to acquire the data from that data field 203 (616). During application of the screen navigation sequence 200, a list identifying all of the screens in the sequence can be displayed by the GUI 110 rather than the actual screens themselves (617). For example, FIG. 4 illustrates an exemplary display with tabs 450a-d identifying the screen names corresponding to the screens 250a-d of sequence 200 of FIG. 2. Additionally, any of the actions noted in the sequence 200 as being required for screen-to-screen navigation through the interface application 191 can be initiated by the sequence applying device 170 in order to access the screen containing the particular data field (618).

As mentioned above, these actions can include activating screen terminators, which can be performed automatically by the sequence applying device without user input (619). However, also as mentioned above, these actions can include filling in form fields. In this case, the method embodiments can further comprise prompting a user through the GUI 110 to input any information required to fill in form fields in the sequence 200 (620). For example, FIG. 4 further illustrates input prompts 401 on tabs 450a-d of FIG. 4 and these input prompts 401 correspond to the required form field inputs 201 of screens 250a-250b in the sequence 200 of FIG. 2, respectively. As discussed in detail above, because a user can change the inputs 401 over what was originally input into fields 201 during screen-to-screen navigation and tracing, the information 404 pulled-up by the sequence applying device 170 and shown in tab 450d of FIG. 4 may be different than the information 204 shown in screen 250d of FIG. 2.

Once data 404 is acquired through application of a given sequence at process 616, the data 404 can be processed manually or automatically, by a data processor 180. Such processing can include, but is not limited, reformatting the data so that it can be fed into and stored by a data warehouse (i.e., a relational database).

Also disclosed herein are embodiments of a computer program product. This computer program product can comprise a computer usable medium. The computer useable medium can have computer useable program code embodied therewith, which can be configured to perform the above-described method embodiments. This computer program product can comprise a tangible computer-usable (i.e., computer-readable) medium on which a computer-useable (i.e., computer-readable) program code (i.e., a control program, a set of executable instructions, etc.) is recorded or embodied. Tangible computer-usable media can, for example, a memory device on which the program is recorded or, alternatively, can comprise a transmittable carrier wave in which the program is embodied as a data signal. Exemplary forms of tangible computer-usable media include, but are not limited to, floppy disks, flexible disks, hard disks, magnetic tape, any other magnetic storage medium, CD-ROM, DVD, any other optical medium, a RAM, a PROM, an EPROM, a FLASH-EPROM, any other memory chip or cartridge, transmission media (e.g., acoustic or light waves generated during radio wave or infrared data communications, respectively) or any other medium from which a computer can read and use program code. In this case, the computer-usable program code can be specifically configured to perform the above-described method of interfacing with a legacy system. That is, the computer-usable program code can be executed by a computer in order to perform the above-described method.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

Therefore, disclosed above are embodiments of a generic interface structure and an associated method for automated data mining of legacy systems using visual configuration tools. In these embodiments, a user employs a graphical user interface (GUI) to navigate through a legacy system interface application in order to access a data field containing data stored by the legacy system. Once a screen with the particular data field is displayed, the GUI receives, from the user, a tag labeling the data field. Additionally, as the user navigates through the interface application, a screen tracing device traces the sequence of events that ultimately results in the data field being displayed. The traced sequence and its corresponding tag are then stored in a data storage device. These processes can be repeated for multiple different data fields accessible through the legacy system interface application. Subsequently, a sequence applying device retrieves one or more particular sequences from the data storage device in response to a request referencing the corresponding tag(s) and automatically applies the particular sequence(s) in order to access, for processing, corresponding data field(s).

One advantage of the above-described embodiments is that they are generic in that they can be used with essentially any legacy system interface application. That is, the interface structure can be used again and again for various screen data mining applications without the need to rewrite code. For each legacy system interface application, only the set of sequence configuration data associated with each data field of interest needs to be generated. Another advantage of the above-described embodiments is that screen definitions are de-coupled from the legacy system interface application software. Thus, screens can change on the legacy system interface application without causing large software re-development efforts. The set of sequence configuration data associated with a changed screen can be easily updated using the visual sequence editor. Yet another advantage of the above-described embodiments is that interfacing with a legacy system can be accomplished quickly using the visual sequence editor, as no tedious task of screen scraping (i.e., counting characters on a screen to find field offsets) is required. Finally, another advantage of the above-described embodiments is that they allow multiple data storage devices to be employed so that storage requirements can change without requiring modifications to the application. Consequently, the above-described embodiments provide for easy, rapid and flexible integration with legacy systems.

What is claimed is:

1. A computer system for interfacing with a legacy system, said computer system comprising:
a graphical user interface operatively connected to said legacy system so as to allow interaction between a user and an interface application of said legacy system, said interface application allowing access to and processing of data stored in said legacy system and said graphical user interface performing the following:
receiving, from said user, inputs for accessing specific data from a particular data field through said interface application of said legacy system, said inputs for accessing said specific data from said particular data field comprising at least specific form field inputs to complete form fields and screen terminator inputs to activate for activating screen terminators;
displaying, as said inputs are received, multiple screens until a final screen with said particular data field containing said specific data is displayed, said multiple screens and said final screen being generated by said interface application based on said inputs for accessing said specific data from said particular data field; and,
when said final screen with said particular data field containing said specific data is displayed, performing the following:
allowing said user to select said particular data field;
displaying, to said user, a window containing a form for entering a tag to label said particular data field; and
receiving, from said user, said tag labeling said particular data field;
a sequence tracing device operatively connected to said graphical user interface and automatically tracing a sequence of events resulting in display of said final screen with said particular data field;
a data storage device operatively connected to said sequence tracing device and storing said sequence of events with said tag in a database table of sequence-tag records; and
a sequence applying device operatively connected to said data storage device and to said graphical user interface,
said graphical user interface further subsequently receiving a request, from a requester, referencing said tag,
said sequence applying device further accessing said database table of sequence-tag records to retrieve said sequence of events in response to said request referencing said tag, and
said sequence applying device automatically applying said sequence of events to said interface application, said applying of said sequence of events to said interface application comprising:
automatically initiating any actions noted in said sequence of events as being required for screen-to-screen navigation through said multiple screens to said final screen; and,
during said screen-to-screen navigation, causing said graphical user interface to display a list of said multiple screens without displaying said multiple screens, causing said graphical user interface to prompt said requester to input different form field inputs to complete said form fields, and automatically inputting said screen terminator inputs to activate said screen terminators, said different form field inputs being different from said specific form field inputs such that, as a result of said screen-to-screen navigation, said particular data field in said final screen contains different data from said specific data that was previously accessed.

2. The computer system of claim 1, said events comprising said actions required for screen-to-screen navigation through said interface application.

3. The computer system of claim 2, said actions comprising at least filling in said form fields and activating said screen terminators.

4. The computer system of claim 1, said data storage device storing said sequence with said tag in one of an Extensible Markup Language (XML) file and a database table.

5. The computer system of claim 1, said list identifying all of said multiple screens in said sequence.

6. The computer system of claim 1, further comprising a data processor operatively connected to said sequence applying device, said data processor processing data contained in said particular data field following application of said sequence by said sequence applying device.

7. A computer system for interfacing with a legacy system, said computer system comprising:
a graphical user interface operatively connected to said legacy system so as to allow interaction between a user and an interface application of said legacy system, said interface application allowing access to and processing of data stored in said legacy system and said graphical user interface performing the following:

separately receiving, from said user, different sets of inputs for accessing data in different data fields through said interface application of said legacy system, said inputs in each of said different sets of inputs comprising at least specific form field inputs to complete form fields and screen terminator inputs to activate screen terminators;

displaying, as each set of inputs for accessing specific data from a particular data field is received, multiple screens until a final screen with said particular data field containing said specific data is displayed, said multiple screens and said final screen being generated by interface application based on said set of inputs for accessing said specific data from said particular data field; and when said final screen with said particular data field containing said specific data is displayed, performing the following:

allowing said user to select said particular data field;

displaying, to said user, a window containing a form for entering a tag to label said particular data field; and receiving, from said user, said tag labeling said particular data field;

a sequence tracing device operatively connected to said graphical user interface and, with each set of inputs, automatically tracing a sequence of events resulting in display of said final screen with said particular data field;

a data storage device operatively connected to said sequence tracing device and, for each set of inputs, storing said sequence of events with said tag in a database table of sequence-tag records; and a sequence applying device operatively connected to said data storage device and said graphical user interface, said graphical user interface further subsequently receiving, from a requester, a request referencing said tag, said sequence applying device further accessing said database table of sequence-tag records to retrieve said sequence in response to said request referencing said tag, and said sequence applying device automatically applying said sequence of events to said interface application, said applying of said sequence of events to said interface application comprising:

automatically initiating any actions noted in said sequence of events as being required for screen-to-screen navigation through said multiple screens to said final screen; and, during said screen-to-screen navigation, causing said graphical user interface to display a list of said multiple screens without displaying any said multiple screens generated by said interface application, causing said graphical user interface to prompt said requester to input different form field inputs to complete said form fields, and automatically inputting said screen terminator inputs to activate said screen terminators, said different form field inputs being different from said specific form field inputs such that, as a result of said screen-to-screen navigation, said particular data field in said final screen contains different data from said specific data that was previously accessed.

8. The computer system of claim 7, said events comprising said actions required for screen-to-screen navigation through said interface application.

9. The computer system of claim 8, said actions comprising at least filling in said form fields and activating said screen terminators.

10. The computer system of claim 7, said data storage device storing said sequence with said tag in one of an Extensible Markup Language (XML) file and a database table.

11. The computer system of claim 7, said list identifying all of said multiple screens in said sequence.

12. The computer system of claim 7, further comprising a data processor operatively connected to said sequence applying device, said data processor processing data contained in said particular data field following application of said sequence by said sequence applying device.

13. A computer-implemented method of interfacing with a legacy system, said method comprising:

operatively connecting said legacy system to a graphical user interface of a computer system so as to allow interaction between a user and an interface application of said legacy system, said interface application allowing access to and processing of data stored in said legacy system;

receiving, by said graphical user interface from said user, inputs for accessing specific data from a particular data field through said interface application of said legacy system, said inputs for accessing said specific data from said particular data field comprising at least specific form field inputs to complete form fields and screen terminator inputs to activate screen terminators;

displaying, by said graphical user interface as said inputs for accessing said specific data from said particular data field are received, multiple screens until a final screen said with particular data field containing said specific data is displayed, said multiple screens and said final screen being generated by said interface application based on said inputs for accessing said specific data from said particular data field;

when said final screen with said particular data field containing said specific data is displayed, allowing said user to select said particular data field;

in response to said user selecting said particular data field, displaying, to said user, a window containing a form for entering a tag to label said particular data field; and receiving, by said graphical user interface from said user, said tag labeling said particular data field;

automatically tracing, by a sequence tracing device of said computer system, a sequence of events resulting in display of said final screen with said particular data field;

storing, by a data storage device of said computer system, said sequence of events with said tag in a database table of sequence-tag records;

receiving, by said graphical user interface from a requester, a request referencing said tag; and in response to said request, automatically accessing, by a sequence applying device of said computer system, said database table of sequence-tag records to retrieve said sequence of events, and automatically applying, by said sequence applying device, said sequence of events to said interface application, said applying of said sequence of events to said interface application comprising:

automatically initiating any actions noted in said sequence of events as being required for screen-to-screen navigation through said multiple screens to said final screen; and, during said screen-to-screen navigation, causing said graphical user interface to display a list of said multiple screens without displaying said multiple screens, causing said graphical user interface to prompt said requester to input different form field inputs to complete said form fields, and automatically inputting said screen terminator inputs to activate said screen terminators, said different form field inputs being different from said specific form field inputs such that, as a result of said screen-to-screen navigation, said particular data field in said final screen contains different data from said specific data that was previously accessed.

14. The method of claim 13, said events comprising said actions required for screen-to-screen navigation through said interface application.

15. The method of claim 14, said actions comprising at least filling in said form fields and activating said screen terminators.

16. The method of claim 13, said storing comprising storing said sequence with said tag in one of an Extensible Markup Language (XML) file and a database table.

17. The method of claim 13, said list identifying all of said multiple screens in said sequence.

18. The method of claim 13, further comprising, following application of said sequence by sequence applying device, processing data contained in said particular data field.

19. A computer program product comprising a non-transitory computer usable medium having computer usable program code embodied therewith, said computer usable program code being executed by a computer system to perform a method for interfacing with a legacy system, said method comprising:

receiving, from a user, inputs for accessing specific data from a particular data field through an interface application of said legacy system, said legacy system being operatively connected to a graphical user interface of said computer system so as to allow interaction between said user and said interface application of said legacy system, said interface application allowing access to and processing of data stored in said legacy system, and said inputs for accessing said specific data from said particular data field comprising at least specific form field inputs to complete form fields and screen terminator inputs to activate screen terminators;

displaying multiple screens until a final screen with said particular data field containing said specific data is displayed, said multiple screens and said final screen being generated by said interface application based on said inputs for accessing said specific data from said particular data field;

when said final screen with said particular data field containing said specific data is displayed, allowing said user to select said particular data field;

in response to said user selecting said particular data field, displaying, to said user, a window containing a form for entering a tag to label said particular data field;

receiving, from said user, said tag labeling said data field;

automatically tracing a sequence of events resulting in display of said final screen with said particular data field;

storing said sequence with said tag in a database table of sequence-tag records;

receiving, from a requester, a request referencing said tag; and in response to said request, automatically accessing said database table to retrieve said sequence of events and automatically applying said sequence of events to said interface application, said applying of said sequence of events to said interface application comprising:

automatically initiating any actions noted in said sequence of events as being required for screen-to-screen navigation through said multiple screens to said final screen; and, during said screen-to-screen navigation, causing said graphical user interface to display a list of said multiple screens without displaying said multiple screens prompting said requester to input different form field inputs to complete said form fields, and automatically inputting said screen terminator inputs to activate said screen terminators, said different form field inputs being different from said specific form field inputs such that, as a result of said screen-to-screen navigation, said particular data field in said final screen contains different data from said specific data that was previously accessed.

* * * * *